United States Patent [19]

Eastham et al.

[11] 4,281,265
[45] Jul. 28, 1981

[54] DISC MOTOR WITH A.C. AND D.C. STATOR WINDINGS

[75] Inventors: John F. Eastham; Peter D. Evans, both of Bath, England

[73] Assignee: KGEL Limited, England

[21] Appl. No.: 951,602

[22] Filed: Oct. 16, 1978

[30] Foreign Application Priority Data

Oct. 17, 1977 [GB] United Kingdom ............... 43016/77
Oct. 17, 1977 [GB] United Kingdom ............... 43017/77

[51] Int. Cl.³ .............................................. H02K 1/12
[52] U.S. Cl. ..................................... 310/254; 310/216; 310/268
[58] Field of Search .................... 310/268, 216–218, 310/254, 259

[56] References Cited

U.S. PATENT DOCUMENTS

| 515,216 | 2/1894 | Gutmann | 310/268 X |
| 2,490,021 | 12/1949 | Aske | 310/268 UX |
| 2,557,249 | 6/1951 | Aske | 310/268 X |
| 2,730,953 | 1/1956 | Pensabene | 310/268 X |
| 3,243,621 | 3/1966 | Wesolowski | 310/268 X |
| 3,261,998 | 7/1966 | Bosco, Jr. et al. | 310/268 X |

FOREIGN PATENT DOCUMENTS

| 503926 | 6/1951 | Belgium . |
| 904311 | 12/1953 | Fed. Rep. of Germany . |
| 87765 | 12/1966 | France . |
| 273210 | 1/1951 | Switzerland . |
| 1381383 | 1/1975 | United Kingdom . |
| 1390692 | 4/1975 | United Kingdom . |
| 1553076 | 9/1979 | United Kingdom . |

Primary Examiner—Mark O. Budd
Attorney, Agent, or Firm—Parmelee, Miller, Welsh & Kratz

[57] ABSTRACT

A disc machine has a stator from which teeth and a central boss project axially in the same direction with the central boss projecting beyond the teeth. An AC winding is wound through the slots between the teeth while a DC winding surrounds the central boss. A bar-like rotor has a central aperture and is mounted for rotation so that the boss passes through the central aperture with an axial gap between the rotor and the teeth.

9 Claims, 7 Drawing Figures

DISC MOTOR WITH A.C. AND D.C. STATOR WINDINGS

This invention relates to disc machines sometimes known as axial gap machines; such a machine has a stator separated by an axial gap from a rotor.

Disc machines are proposed in U.S. Pat. No. 3,261,998 in FIGS. 9 and 10 of which there is illustrated a disc machine having a stator from which teeth project axially, a rotor axially spaced from the stator, an AC winding wound through the slots between the teeth and a DC winding surrounding the stator. The magnetic path is completed through a cylindrical member which surrounds the rotor and the flux path between the stator and rotor partially radial. This machine suffers from the disadvantage that because the machine has to accomodate the winding outside the teeth it must be of large radius thereby reducing its permissible operational speed. In FIG. 12 of the same U.S. Patent there is shown a machine in which the DC current passes through the stator itself which is toroidally wound from strip and the flux path extends through a central magnetic member of the stator. Because the flux path between the stator and rotor is axial the axial force between the stator and rotor are undesirably high.

It is an object of this invention to provide an improved disc machine.

According to this invention there is provided a disc machine comprising a stator from which teeth project axially, a central boss projecting in the same direction as the teeth, a rotor having polar regions and a central aperture and mounted for rotation so that the boss passes through the central aperture and so that there is an axial gap between the rotor and the teeth, an AC winding wound through the slots between the teeth, and a DC winding surrounding the central boss.

By an AC winding is meant a winding intended to be energised with AC and by DC winding is meant a winding which is intended to be energised with DC.

The DC winding produces a magnetic field which energises the rotor which therefore does not need a winding energised with DC through slip rings.

Because the boss passes through the aperture the flux path between the stator and rotor is partially radial reducing the axial forces between the stator and rotor. Moreover because the DC winding surrounds the boss and lies within the teeth the machine diameter can be reduced increasing the permissible rotor speed of the machine. The power output of the machine varies in accordance with the square of the rotor speed. Further, the flux path is relatively short which reduces the cost of the machine.

The machine in accordance with this invention may be one sided, that is to say, it has a rotor only on one side of the stator and consequently there is an axial force produced on the rotor as a result of the magnetic flux in the air gap. In this case although the magnetic flux between the boss and the rotor passes in a radial direction and creates no axial force, the magnetic flux passing between the teeth and the rotor will still produce an axial force.

Preferably, the stator is built up from laminations onto which the said AC winding is wound; this gives a relatively cheap stator construction.

The stator of a disc machine (whether motor or generator) is conventionally constructed by rolling a strip of lamination into an annular core and then machining slots in that annular core to form teeth as is illustrated in FIG. 1 of the accompanying drawings in which the core is denoted at 1, the teeth at 2 and the slots at 3. This construction is expensive because of a number of expensive machining operations.

The stator may comprise a circular stack of laminations to which a plurality of radial cores forming teeth are secured, said radial cores being laminated.

Preferably, the radial cores and L-shaped, corresponding limbs being clamped between clamping plates extending on opposite sides of the circular stack.

In this embodiment the circular stack is preferably cylindrical.

Alternatively, the stator is built-up of L-shaped laminated cores, the ends of corresponding limbs of the cores being mitred to fit together around the central boss.

With this construction the said corresponding limbs appear as spokes from a central point.

Embodiments of this invention will now be described, by way of example only, with reference to the accompanying drawings in which.

Figure 1:
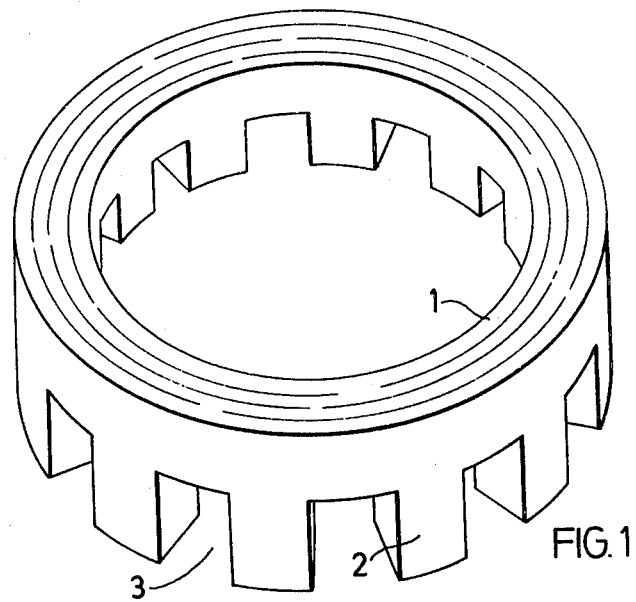
FIG. 1 is a perspective view of the stator of a conventional disc machine and has been described earlier.
Figure 2:
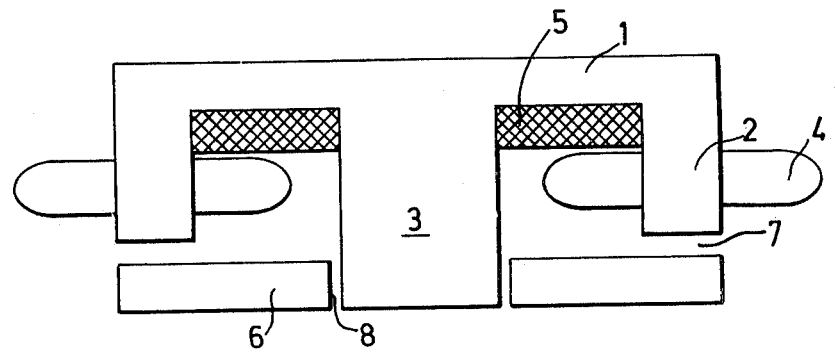
FIG. 2 is a schematic sectional elevation of a disc motor in accordance with this invention.

Referring to FIG. 2, a homopolar disc motor has a stator consisting of a cylinder 1 closed at one end from which teeth 2 project, a central boss 3 projects axially beyond the teeth 2. An AC winding 4 is wound using the slots between the teeth 2 whereas a DC winding 5 is wound around the boss 3. A bar-like rotor 6 with similar poles at its ends has a central aperture 8 by means of which it is rotatably mounted on the boss 3 and is positioned adjacent to the teeth 2 with an axial gap 7 therebetween.

The rotor 6 is magnetised by the DC winding 5 with two similar poles at its ends and consequently the motor is a homopolar machine.

No axial force is generated as a result of the flux passing between the boss 3 and the rotor 6 but there will be an axial force produced by the flux passing between the teeth 2 and the rotor 6.

Figure 6:
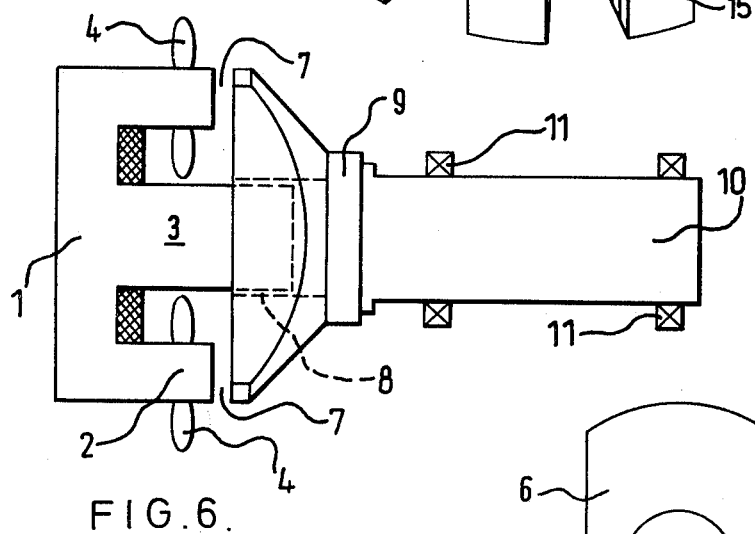
FIG. 6 is a side sectional view of the machine shown in FIG. 2 showing some practical details.
Figure 7:
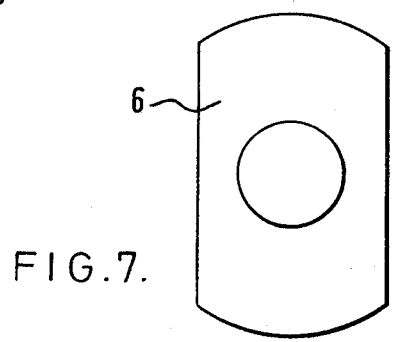
FIG. 7 is a plan view of the rotor 6 of the machine shown in FIG. 6.

As shown in FIG. 6, the rotor 6 which is of mild steel is secured through a non-magnetic stainless steel spacer 9 to a mild steel shaft 10; shaft 10 is rotatable in bearings 11.

Figure 3:
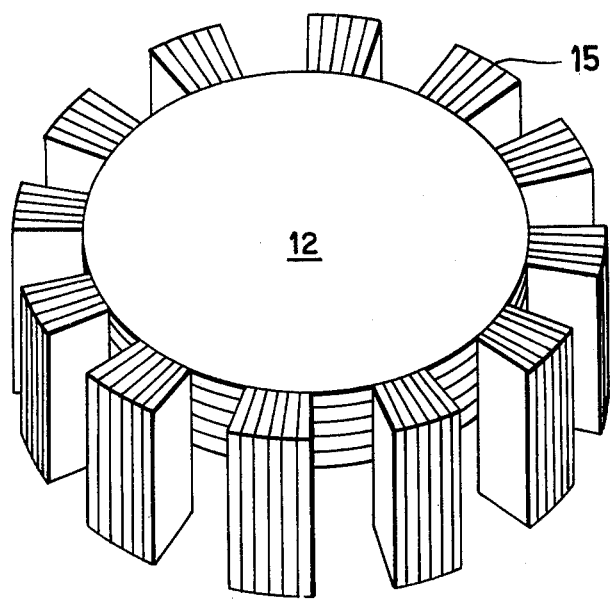
FIG. 3 is a perspective view of a preferred stator of a disc machine in accordance with this invention.

Referring to FIG. 3, the stator comprises a central cylindrical stack 12 of laminations to which there are secured radial cores 15 constituting teeth, each of which consists of a stack of laminations laminated along radial paths. The teeth 15 are arranged around the periphery of the cylindrical stack 12.

This construction is somewhat idealised and, in practice, will not be used. The machine winding is wound onto the teeth in the normal way using the spaces between the radial cores 15 as the machine slots.

Figure 4:
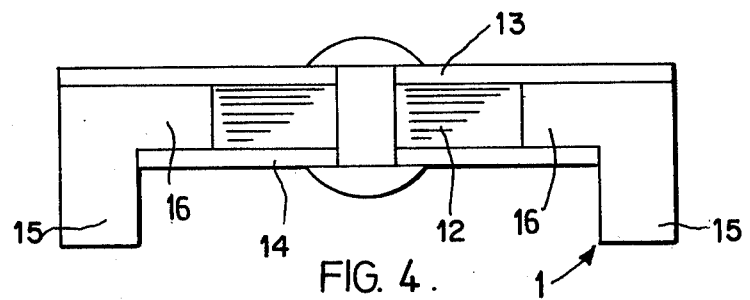
FIG. 4 is a perspective view of an alternative stator of a disc machine in accordance with this invention.

FIG. 4 shows a more practical arrangement in which the central cylindrical stack 12 is present but the radial cores 15 constituting the teeth are L-shaped and are built-up from L-shaped laminations. Corresponding limbs 16 of the cores 15 are clamped between two clamping plates 13 and 14 which also clamp opposite sides of the central cylindrical stack 12.

Figure 5:
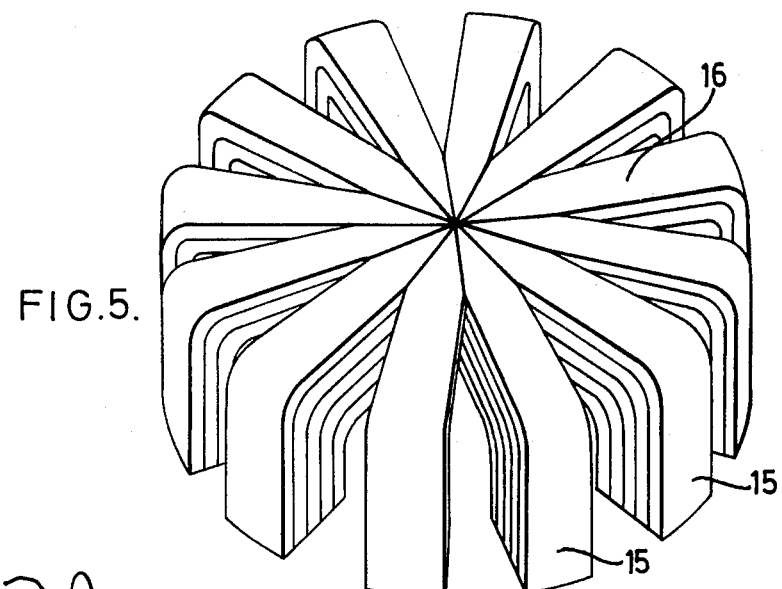
FIG. 5 is a perspective view of yet another stator of a disc machine in accordance with this invention.

The stator illustrated in FIG. 5 of the drawings consists of laminated L-shaped cores 15 in which corresponding limbs 16 are extended and are mitred to fit together. The cores are laminated but not radially in contrast to the radial core of FIG. 4. The particular type of lamination in FIG. 5 is preferred to that of FIG. 4.

In the drawings, radial slots are illustrated although they could be modified to provide skewed slots.

The disc machines in accordance with this invention are suitable for use as the drive motor of a battery powered vehicle. In this case, the disc motor may be a synchronous machine energised from the battery through an inverter. In the illustrated embodiments the rotor is a passive steel member with primary side excitation so that the wound primary section, that is to say the stator, could be replaced quickly in case of failure leaving the robust rotor still in place with its own bearing system.

The use of a synchronous motor has advantages in relation to the use of an induction motor as is disclosed in our British Pat. No. 1,402,321 in that when a synchronous motor is used, the inverter could be frequency locked to the rotor speed for which purpose rotor position sensors would be located on the stator and would control the inverter.

In this case, the switching can be controlled to give a torque angle of 90 electrical degrees between the stator poles and the rotor poles; this will result in reduced axial force and maximum torque.

The inverter could be relatively simple and moreover since a synchronous machine can be arranged to operate at a relatively satisfactory power factor in relation to an induction machine the current switched by the power switching devices of the inverter may be arranged to be relatively low which is highly advantageous.

We claim:

1. A disc machine comprising a circular stator from which teeth project axially, a central boss projecting from the stator in the same direction as the teeth, an AC winding wound through the slots between the teeth, a DC winding surrounding the central boss, a rotor having polar regions and a central aperture passing entirely therethrough, and means for mounting said rotor for rotation so that the boss passes through the central aperture of the rotor and so that there is an axial gap between the rotor and the teeth but only a radial gap between the central boss and the rotor through which magnetic flux may flow between the stator and rotor, said mounting means comprising a shaft axially aligned with the central boss on the stator but extending from the rotor away from the stator.

2. A disc machine as claimed in claim 1, wherein the stator is built up from laminations on to which the said AC winding is wound.

3. A disc machine as claimed in claim 2, wherein the stator comprises a circular stack of laminations to which a plurality of radial cores forming teeth are secured, said radial cores being laminated.

4. A disc machine as claimed in claim 3, wherein the radial cores are L-shaped, corresponding limbs being clamped between clamping plates extending on opposite sides of the circular stack.

5. A disc machine as claimed in claim 3, wherein the circular stack is cylindrical.

6. A disc winding machine as claimed in claim 4, wherein the circular stack is cylindrical.

7. A disc machine as claimed in claim 2, wherein the stator is built-up of L-shaped laminated cores, the ends of corresponding limbs of the cores being mitred to fit together.

8. The disc machine as claimed in claim 1 wherein the shaft is supported by radial bearings only.

9. A disc machine as claimed in claim 1 wherein said shaft is comprised of nonmagnetic material at least in the portion in contact with the rotor.

* * * * *